(12) United States Patent
Bedi et al.

(10) Patent No.: US 11,366,872 B1
(45) Date of Patent: Jun. 21, 2022

(54) DIGITAL NAVIGATION MENUS WITH DYNAMIC CONTENT PLACEMENT

(71) Applicant: Amazon Technologies, Inc., Seattle, WA (US)

(72) Inventors: Kanwar Kabir Singh Bedi, Seattle, WA (US); Mintoo Kakati, Fremont, CA (US); Christopher Keating, Seattle, WA (US); Timothy Whalin, Seattle, WA (US); Sean Janis, Danville, CA (US); Charles Gilliland, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 201 days.

(21) Appl. No.: 15/654,427

(22) Filed: Jul. 19, 2017

(51) Int. Cl.
*G06F 16/957* (2019.01)
*G06F 16/68* (2019.01)
*G06F 16/9537* (2019.01)
*G06F 17/00* (2019.01)

(52) U.S. Cl.
CPC .......... *G06F 16/9577* (2019.01); *G06F 16/68* (2019.01); *G06F 16/9537* (2019.01); *G06F 17/00* (2013.01)

(58) Field of Classification Search
CPC .................................................. G06F 17/00
See application file for complete search history.

(56) References Cited

U.S. PATENT DOCUMENTS

| | | | | |
|---|---|---|---|---|
| 5,446,891 A | * | 8/1995 | Kaplan | G06F 16/94 707/999.005 |
| 7,584,181 B2 | * | 9/2009 | Zeng | G06F 16/9535 707/999.005 |
| 7,716,225 B1 | * | 5/2010 | Dean | G06F 16/951 707/751 |
| 8,938,463 B1 | * | 1/2015 | Kim | G06F 16/9535 707/751 |
| 9,092,510 B1 | * | 7/2015 | Stets, Jr. | G06F 16/3326 |
| 9,355,155 B1 | * | 5/2016 | Cassel | G06Q 20/40 |
| 10,007,936 B1 | * | 6/2018 | Ghoshal | G06Q 50/01 |
| 2005/0027619 A1 | * | 2/2005 | Basak | G06Q 30/0282 705/14.43 |
| 2006/0004892 A1 | * | 1/2006 | Lunt | G06F 16/24578 |
| 2006/0106675 A1 | * | 5/2006 | Cohen | G06Q 30/08 705/37 |
| 2006/0173830 A1 | * | 8/2006 | Smyth | G06F 16/951 |

(Continued)

*Primary Examiner* — William L Bashore
*Assistant Examiner* — Nathan K Shrewsbury
(74) *Attorney, Agent, or Firm* — Eversheds Sutherland (US) LLP

(57) ABSTRACT

Systems, methods, and computer-readable media are disclosed for digital navigation menus with dynamic content placement. Example methods may include determining a first request for a first user interface from a user device, determining a user identifier associated with the first request, and determining user interaction history data using the user identifier. Example methods may include determining a first selectable option for presentation in a first position at the first user interface using the user interaction history, determining a second selectable option for presentation in a second position at the first user interface, generating the first user interface, and sending the first user interface to the user device.

15 Claims, 8 Drawing Sheets

(56) References Cited

U.S. PATENT DOCUMENTS

| | | | | |
|---|---|---|---|---|
| 2006/0195443 A1* | 8/2006 | Franklin | | G06Q 30/02 |
| | | | | 707/999.005 |
| 2007/0005575 A1* | 1/2007 | Dai | | G06F 16/9535 |
| 2007/0061211 A1* | 3/2007 | Ramer | | G06Q 20/322 |
| | | | | 705/25 |
| 2007/0094042 A1* | 4/2007 | Ramer | | G06Q 30/0254 |
| | | | | 707/E17.121 |
| 2008/0162475 A1* | 7/2008 | Meggs | | G06Q 30/02 |
| 2009/0157643 A1* | 6/2009 | Gollapudi | | G06F 16/951 |
| | | | | 707/999.005 |
| 2009/0171813 A1* | 7/2009 | Byrne | | G06F 16/9535 |
| | | | | 705/26.1 |
| 2010/0106706 A1* | 4/2010 | Rorex | | G06Q 30/0277 |
| | | | | 707/706 |
| 2010/0153370 A1* | 6/2010 | Gollapudi | | G06F 16/958 |
| | | | | 707/E17.014 |
| 2010/0169340 A1* | 7/2010 | Kenedy | | G06Q 30/02 |
| | | | | 707/758 |
| 2010/0169343 A1* | 7/2010 | Kenedy | | G06F 16/285 |
| | | | | 707/758 |
| 2010/0228715 A1* | 9/2010 | Lawrence | | G06F 16/93 |
| | | | | 707/706 |
| 2010/0268707 A1* | 10/2010 | Meyerzon | | G06F 16/951 |
| | | | | 707/E17.014 |
| 2011/0231390 A1* | 9/2011 | Inagaki | | G06F 16/951 |
| | | | | 707/E17.084 |
| 2011/0288930 A1* | 11/2011 | Round | | G06F 16/245 |
| | | | | 705/14.55 |
| 2011/0295850 A1* | 12/2011 | Tankovich | | G06F 16/00 |
| | | | | 707/E17.084 |
| 2013/0190978 A1* | 7/2013 | Kato | | H04M 1/72409 |
| | | | | 455/418 |
| 2013/0254025 A1* | 9/2013 | Liu | | G06Q 30/0255 |
| | | | | 705/14.53 |
| 2014/0079297 A1* | 3/2014 | Tadayon | | G06V 40/172 |
| | | | | 382/118 |
| 2014/0180798 A1* | 6/2014 | Bailey | | G06Q 30/06 |
| | | | | 705/14.45 |
| 2014/0189608 A1* | 7/2014 | Shuttleworth | | G06F 3/0481 |
| | | | | 715/863 |
| 2014/0201126 A1* | 7/2014 | Zadeh | | A61B 5/165 |
| | | | | 706/52 |
| 2014/0244447 A1* | 8/2014 | Kim | | G06Q 30/0254 |
| | | | | 705/27.2 |
| 2014/0298194 A1* | 10/2014 | Prasad | | G06F 3/0481 |
| | | | | 715/745 |
| 2016/0143028 A1* | 5/2016 | Mancuso | | H04W 12/00 |
| | | | | 370/338 |
| 2016/0360336 A1* | 12/2016 | Gross | | H04W 4/50 |
| 2016/0360382 A1* | 12/2016 | Gross | | G06F 3/04186 |
| 2017/0032411 A1* | 2/2017 | Tsuchiya | | G06Q 30/0246 |
| 2018/0183891 A1* | 6/2018 | Zhang | | H04L 67/125 |

* cited by examiner

DIGITAL NAVIGATION MENUS WITH DYNAMIC CONTENT PLACEMENT

BACKGROUND

Mobile applications may include navigation menus that can be used to navigate through different portions of the respective mobile application. For example, a navigation menu may include links to content, such as "product categories," "services," "information," and other links that direct a user to different portions or content related to the mobile application. Such navigation menus may be static, in that the navigation menu contains the same links and/or options until the mobile application is updated. Some navigation menus cause the user to make a number of selections to be directed to particular content or a portion of the mobile application they intend to consume or view, such as by navigating submenus and the like. Users may have different preferences and/or may desire to be directed to different portions of the mobile application, and some users may therefore make more selections to reach certain content than other users that desire to access content that is, for example, in a main menu rather than a submenu. Accordingly, users may desire to quickly access desired content or portions of a mobile application using a navigation menu.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
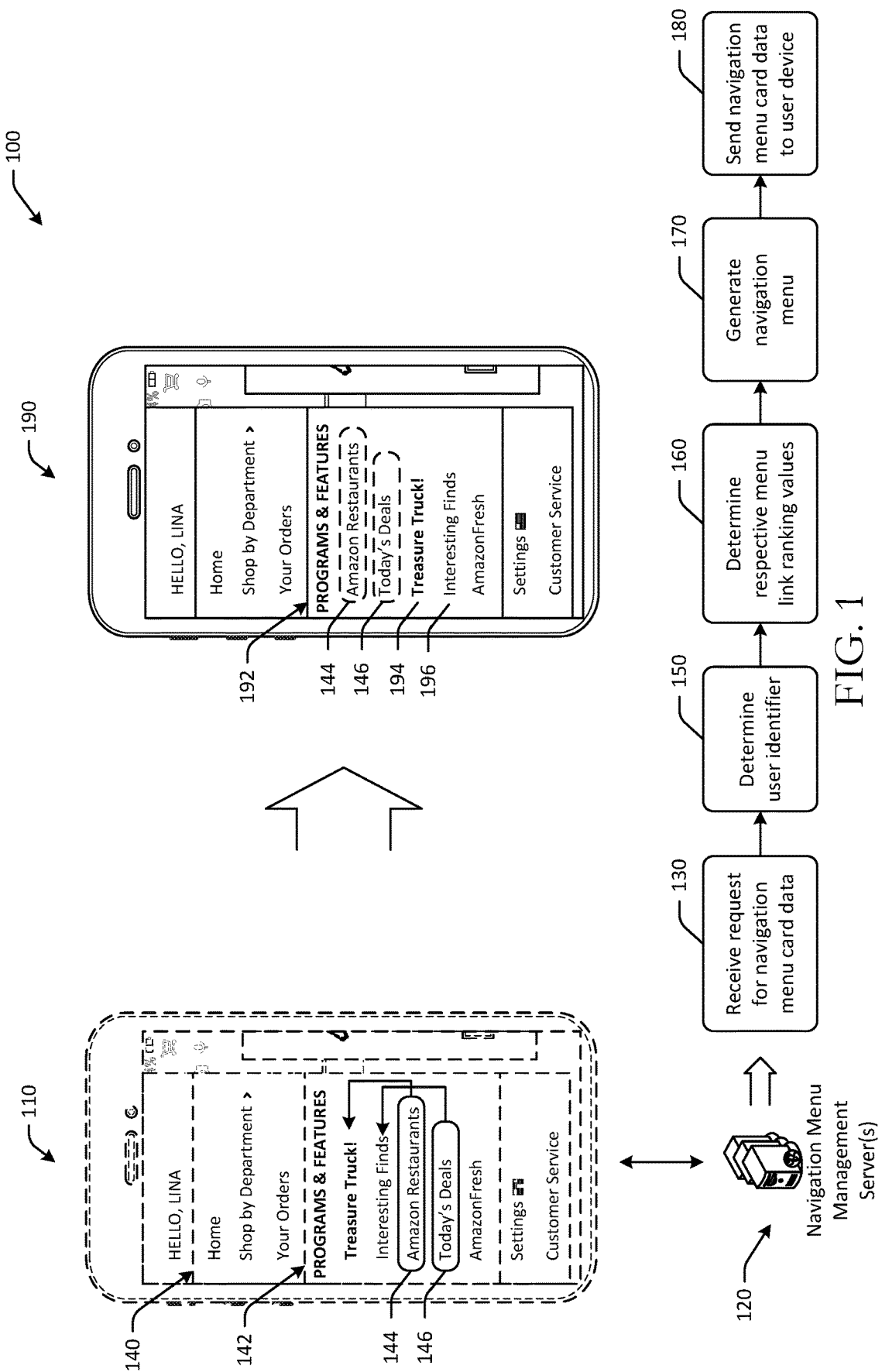
FIG. 1 is a hybrid schematic diagram and process flow of an example use case illustrating digital navigation menus with dynamic content placement in accordance with one or more example embodiments of the disclosure.

Users may use navigation menus of mobile applications or other computer applications (e.g., laptop/desktop computing applications, etc.) to navigate through one or more portions of the respective application. Accordingly, users may naturally spend time interacting with a navigation menu of a digital application, so as to navigate to desired content or to a specific portion of the application. Depending on the desired content, users may make a number of selections in order to be directed to the content. For example, if a link to the desired content is in a submenu, the user may have to select a menu option, and then a submenu option in order to be directed to the content. Other content may be positioned at or near a bottom of a menu list and may be accessed by scrolling through the menu list. Users may therefore have to make a number of selections, or may have a number of interactions (e.g., scrolling, swiping, etc.), to access desired content.

Some users may routinely access certain content that may take a number of interactions to access using a navigation menu. Accordingly, each time the user desires to access the content, the user may have to perform the interactions in a static navigation menu. Therefore, digital navigation menus that provide dynamic positioning of links to content or selectable options that may be personalized or customized to a user of the device and/or the application may reduce a number of interactions that the user has to make in the application, thereby reducing an amount of time that is spent accessing the desired content and/or being directed to the content or finding a link, and improving a user experience with the application.

Embodiments of the disclosure include digital navigation menus with dynamic content placement for presentation to a user of an application. Content, such as images, swipeable cards, links, selectable options or elements, and other content may be dynamically placed or repositioned. For example, content in a navigation menu, such as selectable links, may be reordered or rearranged based at least in part on user preferences, predicted user selections, time of day, seasonality, geographic location, and other factors. As a result, navigation menu content may be tailored to, or otherwise customized to, a user of the application. Users may therefore locate and/or identify desired links or other content with a reduced number of interactions with the user interface, or in a reduced amount of time, than with a static navigation menu. In addition, by arranging links or content based at least in part on predicted user selections, a user experience with the application may be improved and may reduce a need for the user to spearfish or search for desired content through a number of interactions or selections within the user interface.

Certain embodiments may include personalized digital navigation menus that surface or prioritize links that a user uses frequently and/or is predicted to select during use of an application. Navigation menus may include content with dynamic placement or arrangements, and may include swipeable cards, links, and the like. Placement of content in navigation menus may be determined based at least in part on user interaction data for user interactions with the application and/or navigation menu. For example, user selections, swipes, taps, gestures, audio commands, and the like may be monitored and used to predict future selections, and may also be aggregated to determine a frequency of selection. Such user interaction data may be used to determine the arrangement of links or content in the navigation menu. User interaction data may be monitored by a user device and/or a remote server, and may be associated with or linked to a user identifier and/or device identifier. Certain embodiments may include avatars or other images in the navigation menu, along with time-based greetings, such as "Good Morning" and "Good Evening."

This disclosure relates to, among other things, devices, systems, methods, computer-readable media, techniques, and methodologies for digital navigation menus with dynamic content placement. Certain embodiments may therefore provide a personalized experience for users that surface categories and programs most relevant to the specific user. New relevant content may be presented and time spent searching may be reduced. Processing resource consumption may be reduced in view of fewer interactions received from a user and reduced lengths of time in presenting desired content. Navigation menu content may be aggregated from a number of different and diverse sources and presented in the navigation menu. Content may include links to products, product categories, new and interesting finds, things most bookmarked by other users, collections, user's posts about products, engaging discussions in varied interests, updates from people and brands followed, media from favorite artists or shows, and/or other categories. Some embodiments may arrange links or content in navigation menus based at least in part on a selection rate or a click-through rate (e.g., a number of clicks on a link divided by a number of impressions presented of the link, etc.), a frequency of selection, and/or an absolute number of selections. In some embodiments, certain user interactions with a navigation menu may be weighted differently. For example, recent user selections or interactions (e.g., last 30 days, etc.) may be weighted more heavily than other user selections or interactions (e.g., older than 90 days, etc.). Similarly, user interactions resulting in purchases may be weighted more heavily than interactions that did not result in purchases.

Referring to FIG. 1, an example use case for digital navigation menus with dynamic content placement is illustrated in accordance with one or more embodiments of the disclosure. In FIG. 1, a number of user interfaces 100 are presented as part of an initial navigation menu of a mobile application. The initial navigation menu may be a digital navigation menu with selectable links that direct the application to certain content. As illustrated at a first user interface 110, the initial navigation menu may be presented at a user device. The user device may be in communication with one or more remote servers, such as a navigation menu management server 120. In some embodiments, the initial navigation menu may be presented in response to a user selection of an icon or other portion of a user interface, while in other embodiments, the initial navigation menu may be presented automatically as an initial user interface of the application. The initial navigation menu may be used to navigate to particular content and/or to a specific portion of the mobile application, as well as to access one or more swipeable cards in some embodiments.

The navigation menu management server 120 may be configured to generate the navigation menu for presentation at the user device. For example, the navigation menu management server 120 may execute one or more operations to generate navigation menus with dynamic content placement. At a first operation 130, the navigation menu management server 120 may receive a request for navigation menu card data. The navigation menu presented at the first user interface 110 may be a card or other user interface element that can be interacted with, and may include a menu list, or a list of selectable elements. For example, a user may swipe, tap, select, click, scroll, flip, or otherwise interact with the navigation menu card. The request may be from a user device for a navigation menu user interface and/or navigation menu card data for a mobile application, and may include a user identifier of a user of the mobile application.

The first user interface 110 may be a previous navigation menu that was presented to a user of the user device. The first user interface 110 may include a first section 140 with selections such as "home," "shop by department," "your orders," or other selections. In some embodiments, the first section 140 may include "most frequently used" links that are aggregated over time. The first user interface 110 may include a second section 142 that may be "programs and features." The second section 142 may include content that directs the user to one or more submenus or specific content. One or more of the first section 140 or the second section 142 may include links to content, where the links can be dynamically positioned or arranged, so as to facilitate location and/or selection of the links. For example, a first link 144 may be labeled "Amazon restaurants" and a second link 146 may be labeled "today's deals." At the first user interface 110, the first link 144 may be positioned relatively higher, or above, the second link 146 in the illustrated menu list. The first link 144 may be a first selectable link in a first position of the menu list and the second link 146 may be a second selectable link in a second position of the menu list, where the first position is relatively higher than the second position.

At a second operation 150, the navigation menu management server 120 may determine a user identifier. For example, the navigation menu management server 120 may determine a user identifier associated with the request for navigation menu card data. The user identifier may be a user account or user profile identifier for a user of the user device and/or a user of the mobile application. In some embodiments, a device identifier may be used instead of, or in addition to, the user identifier.

At a third operation 160, the navigation menu management server 120 may determine respective ranking menu list values. For example, for some of, or each of, the links in the first section 140 and/or the second section 142 of the navigation menu, the navigation menu management server 120 may determine ranking menu list values. The ranking menu list values may be numerical or other values indicative of, or used for, a ranking or position of the respective link in the menu list. Links in the menu list may be ordered based at least in part on the ranking menu list values. For example, ranking menu list values may be determined based at least in part on an absolute number of times the link has been selected, as indicated by historical data associated with the user identifier. The absolute number of times may be for a certain time interval, such as the last 30 days, the last 90 days, or another interval. In another example, ranking menu list values may be based at least in part on a selection rate, or a ratio of selections of the link to impressions presented of the link. In another example, ranking menu list values may be determined based at least in part on a geographic location of the user or the user device, a time of day, a predicted user action or interaction, or other factors. Ranking menu list values may be determined and used to sort the respective links in, for example, ascending or descending order. For example, a link with the highest ranking menu list value may be presented in a first position in the menu list, and a link with the lowest ranking menu list value may be presented in a last position, or in a submenu. In the example of FIG. 1, the first link 144 for "Amazon restaurants" may be determined to have the highest ranking menu list value, and the second link 146 for "today's deals" may be determined to have the second highest ranking menu list value. This is in contrast to the presentation at the first user interface 110, at which "Treasure Truck!" may have been determined to have the highest ranking menu list value, and "interesting finds" may have been determined to have the second highest ranking menu list value.

At a fourth operation 170, the navigation menu management server 120 may generate a navigation menu. For example, the navigation menu management server 120 may generate a navigation menu user interface for presentation at the user device. In the navigation menu, the first link 144 may be positioned relatively higher than the second link 146.

At a fifth operation 180, the navigation menu management server 120 may send the navigation menu to the user device. For example, the navigation menu management server 120 may send data for the navigation menu user interface to the user device for presentation. The user device may render the navigation menu using the data received from the navigation menu management server 120.

For example, at a second user interface 190, the navigation menu may be rendered by the user device. The navigation menu may include a second section 192 with a menu list of links. As illustrated in FIG. 1, the first link 144 may be repositioned at the highest position in the menu list, or the first rank, and the second link 146 may be repositioned at the second highest position in the menu list, or the second rank. The "Treasure Truck!" link may be positioned in a third position 194 in the menu list, and the "interesting finds" link may be positioned in a fourth position.

The navigation menu may therefore be rearranged based at least in part on links that the user is likely to select. For example, a time of day when the second user interface 190 is presented may be near dinnertime, and, based at least in part on historical user interaction data, the navigation menu management server 120 may determine that the user is likely to select "Amazon restaurants." As a result, the "Amazon restaurants" link may be repositioned to a first position, so as to facilitate selection by the user.

If the user selects the "Amazon restaurants" link at the second user interface 190, the navigation menu management server 120 may determine that the first link 144 was selected. For a subsequent navigation menu for the user identifier, the navigation menu management server 120 may determine a first selection rate for the first link 144, where the first selection rate is indicative of a historical selection percentage of the first link 144 when presented at the user device, and may determine a second selection rate for the second link 146, where the second selection rate is indicative of a historical selection percentage of the second link 146 when presented at the user device. In one example, the navigation menu management server 120 may determine which link has the greater selection rate, and may determine that that link is to be presented relatively higher than the other in a subsequent navigation menu user interface.

Some embodiments may generate new navigation menus periodically, upon request, or at a frequency that is capped during a time interval. For example, navigation menus with reordered links or adjusted content placement may be generated once every 30 minutes (or any other time interval), so as to avoid constant change for a user. In such instances, requests for new navigation menus for a user identifier may be fulfilled with previously generated navigation menu data or may be discarded.

In some embodiments, ranking values may be modified by, or based at least in part on, one or more factors such as location, time, usage behavior, and/or user preferences. For example, weather information may be shown based on a device location, special content may be presented based on a location of a device (e.g., Treasure Truck links may be shown when the device is within a predetermined distance of a Treasure Truck or other location, etc.), and the like. In another example, navigation menu color schemes may be based on a time of day (e.g., night mode, etc.), links for upcoming birthday gifts may be prioritized, and the like.

The systems, methods, computer-readable media, techniques, and methodologies for digital navigation menus with dynamic content placement may facilitate presentation of timely and relevant links and content to users leading to an increase in functionality for navigation menus of applications. As a result of improved functionality, users may locate links and content with a reduced number of interactions with a user interface, and may consume and discover content directly from a navigation menu and without having to specifically identify or guide themselves to content that is relevant or of interest to the user.

Example embodiments of the disclosure provide a number of technical features or technical effects. For example, in accordance with example embodiments of the disclosure, certain embodiments of the disclosure may improve navigation menu functionality, reduce latency in presentation at devices by reducing a number of user interactions needed to access certain content, and determining real-time or near real-time performance data that can be used to update or modify various aspects of navigation menu lists. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
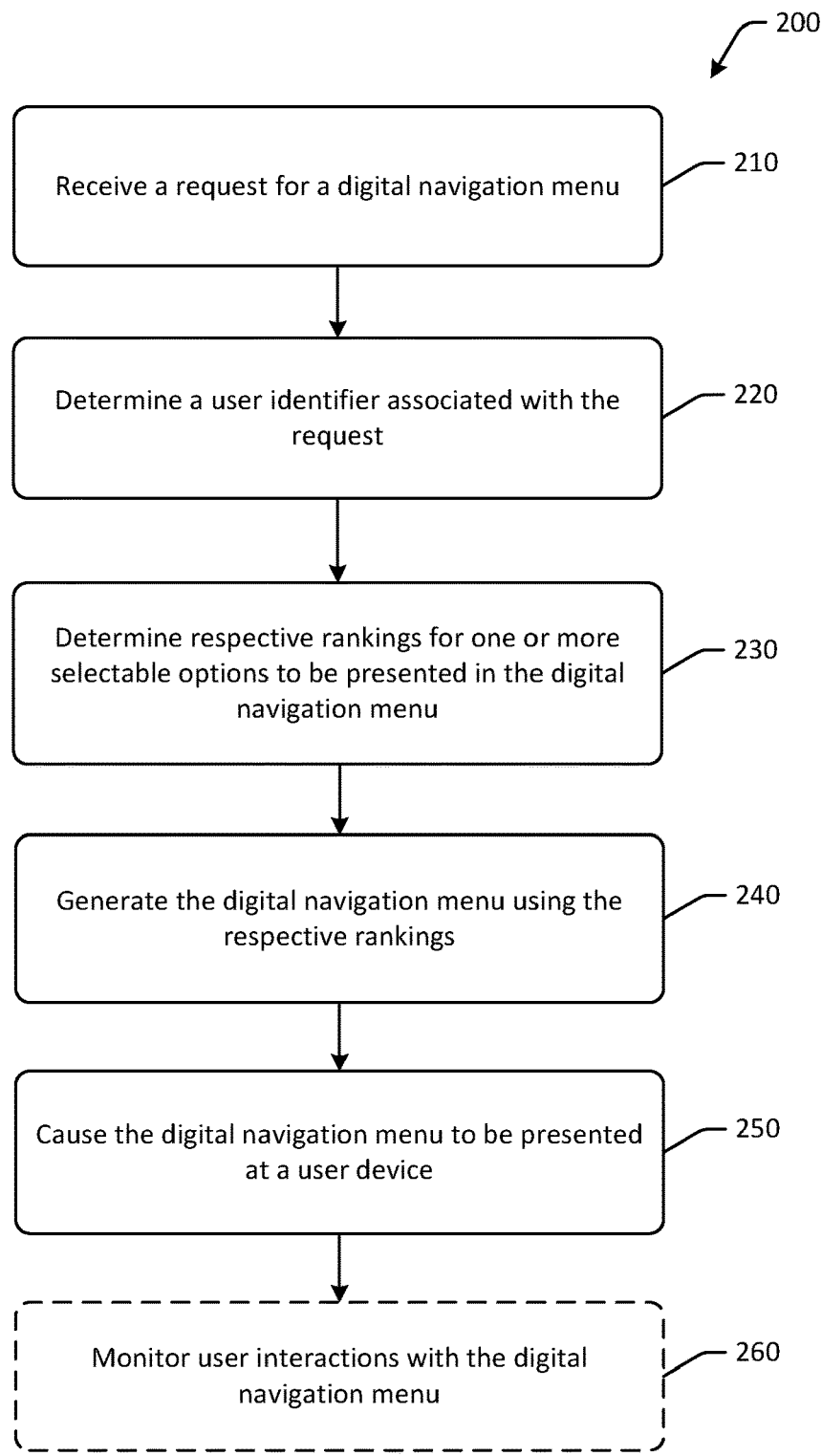
FIG. 2 is a schematic illustration of an example process flow for generating digital navigation menus with dynamic content placement in accordance with one or more example embodiments of the disclosure.

FIG. 2 depicts an example process flow 200 for generating digital navigation menus with dynamic content placement in accordance with one or more example embodiments of the disclosure. While example embodiments of the disclosure may be described in the context of navigation menus, it should be appreciated that the disclosure is more broadly applicable to main menus or menus accessible from most, if not all, portions, of an application. Some or all of the blocks of the process flows in this disclosure may be performed in a distributed manner across any number of devices. The operations of the process flow 200 may be performed in a different order.

At block 210, a request for a digital navigation menu may be received. For example, computer-executable instructions stored on a memory of a device, such as a navigation menu management server, may be executed to receive a request for a digital navigation menu from a user device. The digital navigation menu may be for presentation as a menu of an application. The digital navigation menu may be a navigation menu user interface that includes an ordered list of selectable options. The selectable options may be links to various content, such as products, product categories, news, and other visual and audio content.

At block 220 of the process flow 200, a user identifier associated with the request may be determined. For example, the request may include a user identifier and/or a device identifier. In one embodiment, computer-executable instructions stored on a memory of a device may be executed to determine the user identifier using the request and/or the device identifier.

At block 230 of the process flow 200, respective rankings may be determined for one or more selectable options to be presented in the digital navigation menu. The digital navigation menu may include content arranged in a specific order, such as links arranged in a scrollable menu list, swipeable cards with digital content arranged in an order for swiping, and the like. In one embodiment, computer-executable instructions stored on a memory of a device may be executed to determine respective rankings for one or more selectable options to be presented in the digital navigation menu a second card for presentation to the user. Rankings may be determined specific to a user using the user identifier and associated historical data. For example, historical user interaction data may be identified and used to determine selection rates of various links or content, a number of selections of content, and the like. Additional factors, such as location, time, device type, and other factors may be used to determine rankings. Rankings may indicate where the corresponding link is positioned in the order of presentation and/or order in a menu list. For example, higher rankings may indicate that the link or content will be positioned higher or presented before lower ranked links or content. In one example, computer-executable instructions stored on a memory of a device may be executed to determine that a first selection rate for a first selectable option is greater than a second selection rate for a second selectable option using the user interaction history. The first selectable option may therefore be prioritized for presentation over the second selectable option. In another example, computer-executable instructions stored on a memory of a device may be executed to determine that a first number of user interactions with the first selectable option is greater than a second number of user interactions with the second selectable option using the user interaction history. The first selectable option may therefore be prioritized for presentation over the second selectable option.

At block 240 of the process flow 200, the digital navigation menu may be generated using the respective rankings. For example, computer-executable instructions stored on a memory of a device may be executed to generate the digital navigation menu using the respective rankings, where links or content in an ordered list are positioned or arranged in accordance with the respective ranking values, and links or content such as swipeable cards are arranged in an order of presentation in accordance with the respective ranking values.

At block 250 of the process flow 200, the digital navigation menu may be caused to be presented at a display of the user device. For example, computer-executable instructions stored on a memory of a device may be executed to send data associated with the digital navigation menu to the user device and cause the digital navigation menu to be presented at a display of the user device.

At optional block 260 of the process flow 200, user interactions with the digital navigation menu may be monitored. Such user interaction data may be monitored and/or stored by the user device or a remote server, and may be used to determine subsequent ranking values. For example, user interaction data may be used to determine selection rates, selections, and the like. In some embodiments, user interaction data may be associated with or linked to the user identifier. The user interaction data may be sent periodically by the user device to one or more remote servers. In one embodiment, a user device or a remote server may determine a first user interaction event with a selectable option in a digital navigation menu user interface, and may store user interaction data that includes an indication of the first user interaction event, a timestamp, and position information of the selected option (e.g., what the ranking value of the selected option was, where the option was presented on the user interface, such as below the fold, etc.).

Figure 3:
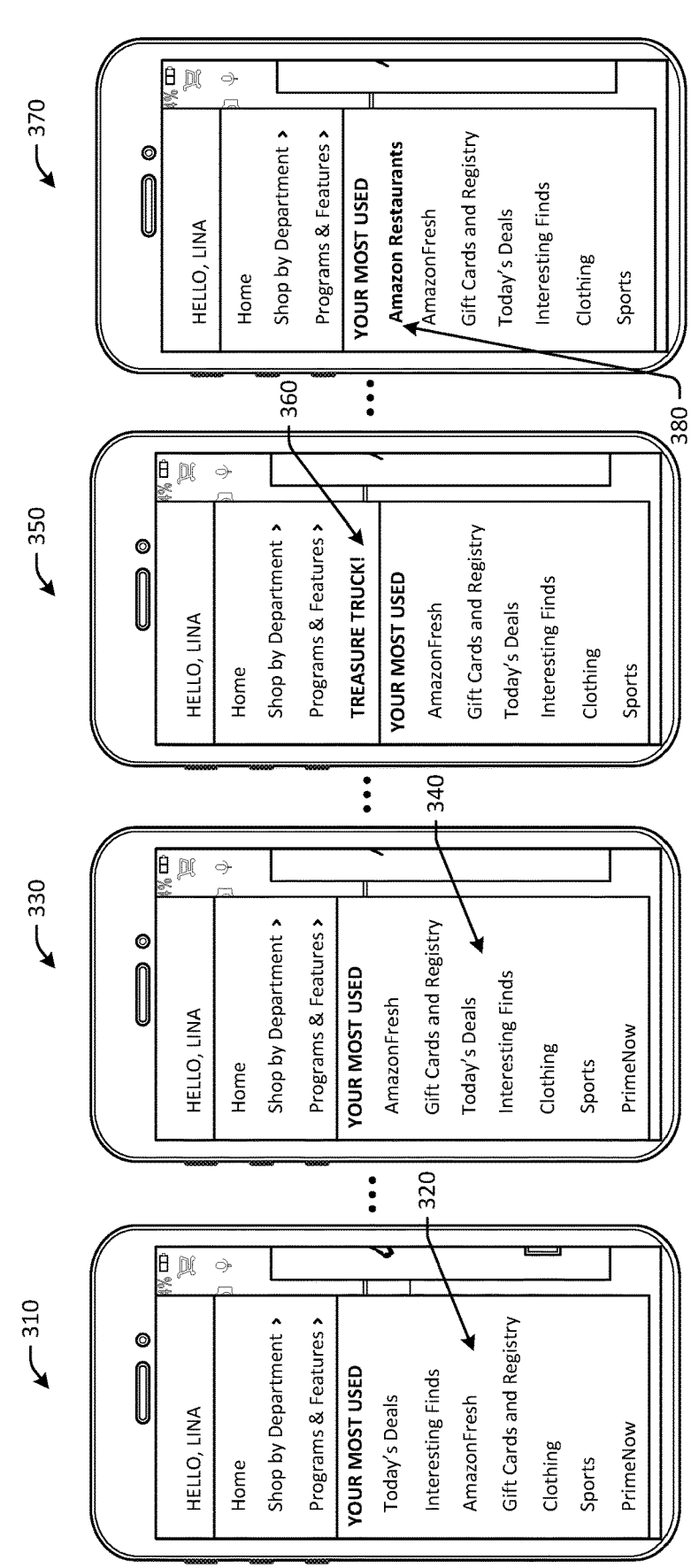
FIG. 3 is a schematic illustration of an example digital navigation menu list with dynamic content placement in accordance with one or more example embodiments of the disclosure.

FIG. 3 depicts a schematic illustration of example digital navigation menus 300 with dynamic content placement in accordance with one or more example embodiments of the disclosure. In the example of FIG. 3, a first digital navigation menu 310 may be a menu of a computing application that can be used to direct users to specific portions of the applications or to specific content. The first digital navigation menu 310 may include a number of text-based links that are configured to direct a user to particular categories or portions of the application, or to particular content. In some embodiments, the first digital navigation menu 310 may include one or more swipeable cards that can be accessed from the first digital navigation menu 310.

The first digital navigation menu 310 may be first in time with respect to the other digital navigation menus 300. In the first digital navigation menu 310, a "your most used" section 320 may have links arranged in a first order. For example, "today's deals" may be in a first position. The arrangement of the links and/or content in the digital navigation menus 300 may change over time.

For example, at a second point in time, a second digital navigation menu 330 may be generated and presented. In the second digital navigation menu 330, the "your most used" section 340 may be modified with a different order of presentation, as determined based at least in part on the ranking values for each of the links or content. For example, "AmazonFresh" may be a top ranked link and may be in the first position.

At a third point in time, a third digital navigation menu 350 may be generated and presented. In the third digital navigation menu 350, special content 360 may be presented as part of the third digital navigation menu 350. The special content 360 may be time-based, location based, user context based (e.g., upcoming birthdays or events, etc.), and the like. For example, a "Treasure Truck!" link may be presented in the third digital navigation menu 350 when the user device is located within a predetermined geographical area or at a predetermined location.

Certain links or content may be prioritized in some embodiments. For example, the special content 360 may be presented in a separate section of the third digital navigation menu 350, or may be presented in a first position. In some embodiments, prioritization may be determined based at least in part on historical purchase data. For example, historical purchase data may be determined using a user identifier. A likelihood of selection may be determined of a particular selectable link or content. The likelihood of selection may be a probability value and may be compared to a prioritization threshold to determine whether the prioritization threshold is satisfied. If the threshold is satisfied, the link or content may be presented in a position that is greater than its corresponding rank value, such that the rank value is overridden or modified. In the example of the third digital navigation menu 350, the user may have previously made purchases from the "Treasure Truck!" link, and although "AmazonFresh" may have a higher ranking value, the "Treasure Truck!" link may be prioritized for presentation over the "AmazonFresh" link.

At a fourth point in time, a fourth digital navigation menu 370 may be generated and presented. In the fourth digital navigation menu 370, the "your most used" section 380 may be modified with a different order of presentation, as determined based at least in part on the ranking values for each of the links or content. For example, "Amazon Restaurants" may be a top ranked link and may be in the first position. The "Amazon Restaurants" link may be determined to have the highest ranking value based at least in part on a time of day. For example, using historical purchase data associated with a user identifier and a timestamp of a menu request or a time of day, certain embodiments may determine a predicted user selection. For example, based at least in part on a user's historical selection of "Amazon Restaurants" on Monday evenings, the "Amazon Restaurants" link may be determined to have the highest ranking value and positioned in the first position.

Figure 4:
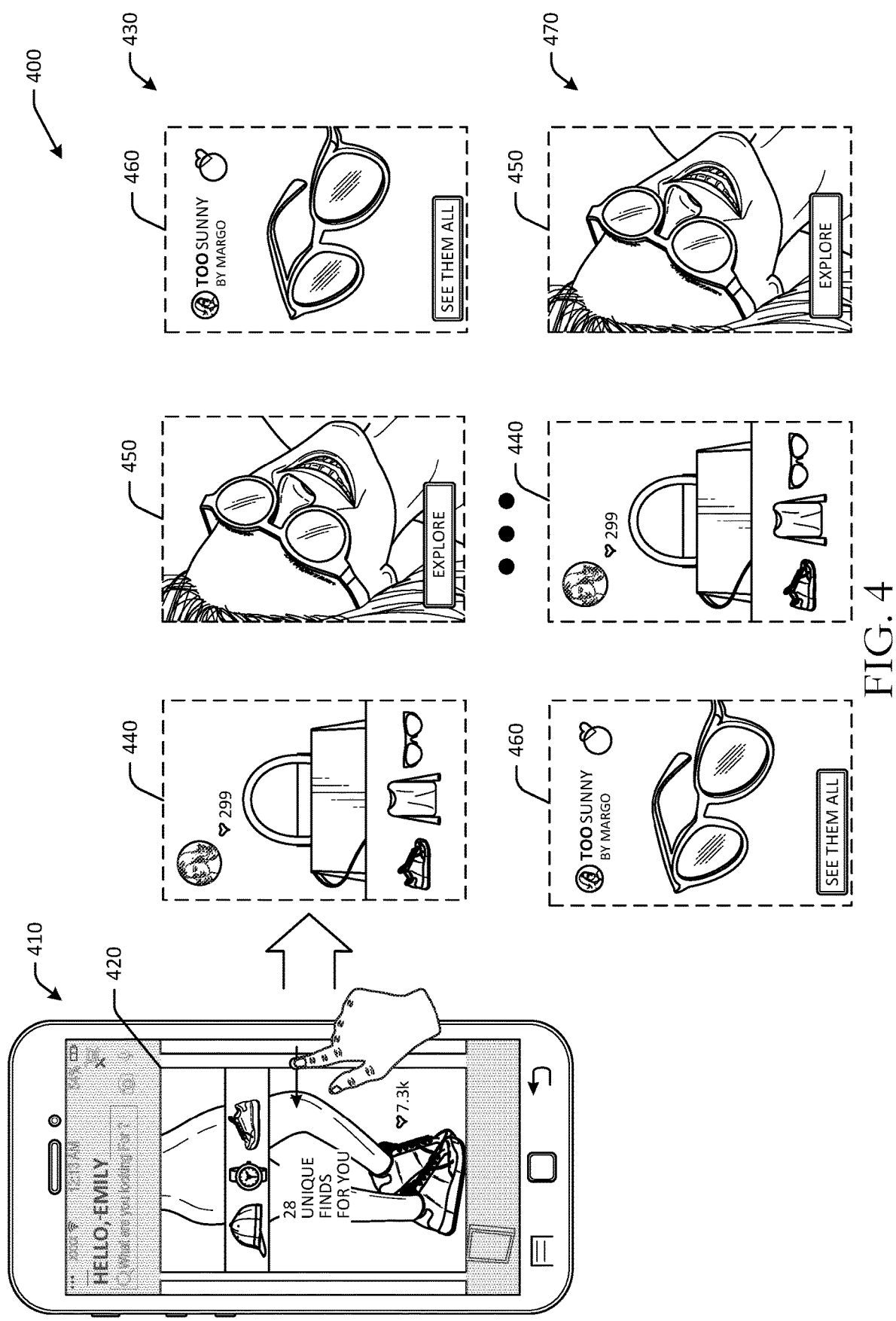
FIG. 4 is a schematic illustration of an example digital navigation menu with swipeable cards having dynamic placement in accordance with one or more example embodiments of the disclosure.

FIG. 4 is a schematic illustration of an example digital navigation menu with swipeable cards 400 having dynamic placement in accordance with one or more example embodiments of the disclosure.

A digital navigation menu 410 may be presented at a user device and may include a number of swipeable cards that can be accessed from the digital navigation menu 410. The swipeable cards may be floating user interface elements that can be manipulated using a number of user interactions, such as taps, clicks, swipes, flips, gestures, and other interactions. In some embodiments, one or more swipeable cards may have different content on a front side, or a first side, and a back side, or a second side, of the digital card. For example, first content, such as an image, may be on a front side of the card that is presented to a user initially, and the user may swipe up on, or flip, the card to see the back side of the card, which may include text or other content related to the image on the front side. The swipeable cards may be accessible from, and in some embodiments only accessible from, the navigation menu of the application. Accordingly, when a user opens the navigation menu, the swipeable cards may be accessible and/or presented to the user. For example, a first swipeable card 420 may present content related to "unique finds" for the user.

Content, such as images, audio, video, text, links, and other content, that is included in the swipeable cards may be provided by one or more remote servers, such as a navigation menu management server. Card content may be personalized based at least in part on a user profile, such as previous user interactions, purchase or browse histories, and other historical data. The content may be provided in groups, such as in batches of three cards, five cards, or another number of cards, or on an as-needed basis, such as after a user has interacted with one or more of the cards, or has consumed all of the previously sent cards. Therefore, content provided on the cards may be updated periodically, such as daily, without requiring updates to the application itself.

Cards may be presented in a particular order. The first card 420 may be the first card in a series of swipeable cards that the user can swipe through to consume. For example, the user may swipe over the first card 420 to be presented with a second card. The order of presentation of the swipeable cards 400 may be modified based at least in part on the user identifier of the user to which the cards will be presented. For example, in a default order of presentation 430, a second card may be a handbag card 440, a third card may be an explore card 450, and a fourth card may be a sunglasses card 460.

However, the order of presentation may be modified based at least in part on the user identifier. For example, an order of presentation 470 for the user identifier in the example of FIG. 4 may be that the second card is the sunglasses card 460, the third card is the handbag card 440, and the fourth card is the explore card 450.

The order of presentation for the swipeable cards 400, or for links in a menu list, may be determined based at least in part on a likelihood that the user will interact with the card. For example, a navigation menu management server may determine a first probability value indicative of a likelihood that the first selectable option, or the handbag card 440, will be selected or otherwise interacted with, a second probability value indicative of a likelihood that the second selectable option, or the explore card 450 will be selected or otherwise interacted with, and a third probability value indicative of a likelihood that the third selectable option, or the sunglasses card 460 will be selected or otherwise interacted with. The cards may be rearranged or ordered in an order of presentation based at least in part on the respective probability values.

In some embodiments, an order of positioning, or an arrangement, may be determined by determining a first user interaction metric for a first card, determining a second user interaction metric for a second card, and determining an order of presentation for the first card and the second card at the digital navigation menu using the first user interaction metric and the second interaction metric. User interaction metrics may include popularity, clicks, views, purchases, shares, likes, and other metrics. User interaction metrics may be indicative of user engagement with digital content of a card for a plurality of users. Cards with digital content that has relatively high user interaction metrics may be prioritized, or positioned ahead of, other content as the content may be more relevant or interesting than other content. User interaction metrics may be device type specific and/or device form factor specific. For example, user interaction metrics for users using smartphone devices may be distinguished from user interaction metrics for users using television devices. As a result, selection of content or cards, as well as order of presentation of cards, may be determined based at least in part on a device type or device form factor of the device on which the card will be presented. For example, video-based content may be more likely to be presented at televisions, while micro-game content may be more likely to be presented at smartphones, as more users may be likely to interact with such content on the respective platforms. Cards may be added or removed from a series or queue based at least in part on a device type or form factor at which the card is to be presented.

Figure 5:
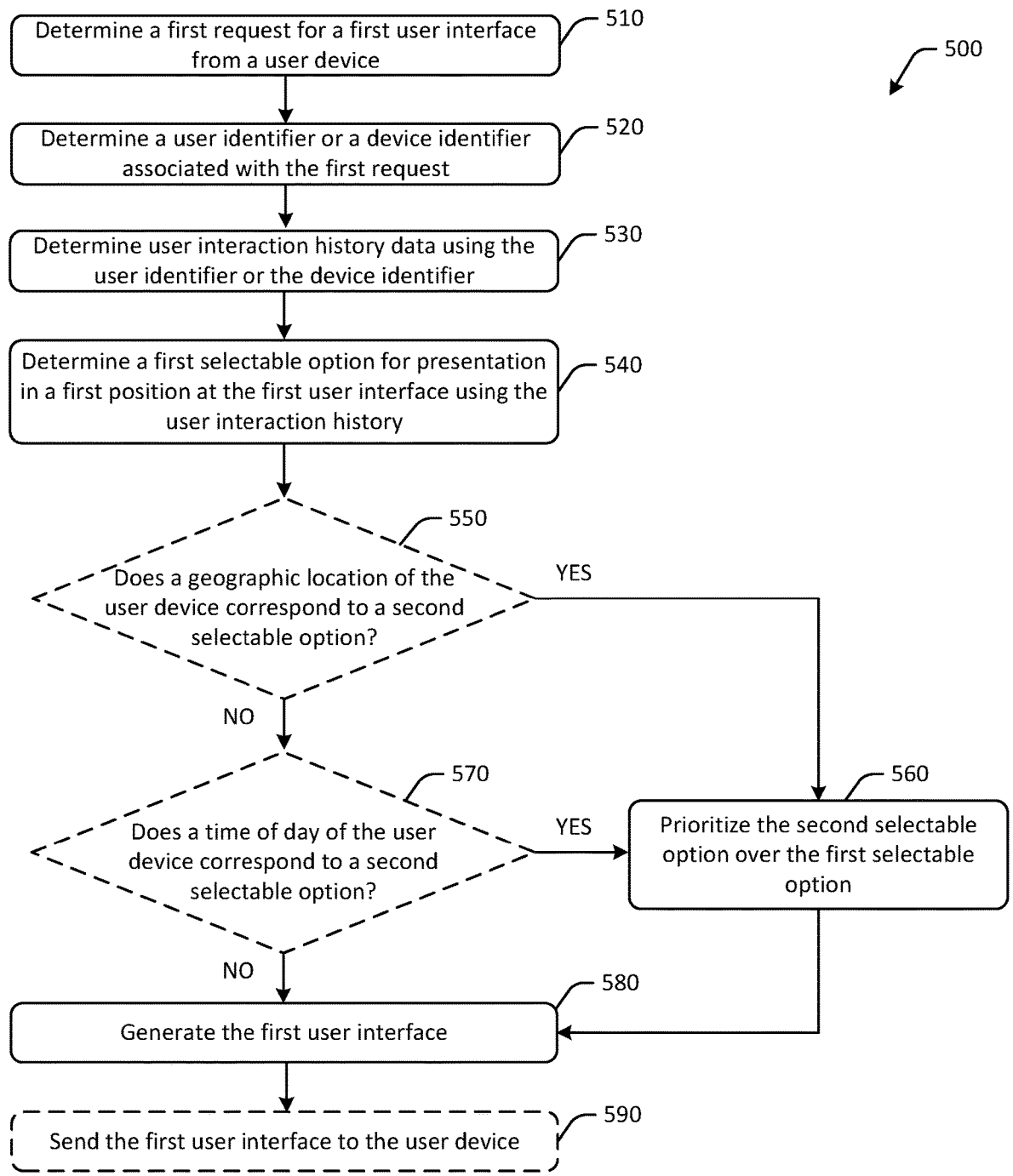
FIG. 5 is a schematic illustration of an example process flow for generating digital user interfaces with dynamic content placement in accordance with one or more example embodiments of the disclosure.

FIG. 5 is a schematic illustration of an example process flow 500 for generating digital user interfaces with dynamic content placement in accordance with one or more example embodiments of the disclosure.

At block 510, a first request for a first user interface from a user device may be determined. The first request may include a user identifier and/or a device identifier. At block 520, a user identifier or a device identifier that is associated with the first request may be determined. At block 530, user interaction history data is determined using the user identifier or the device identifier. The user interaction history may include historical selections, swipes, taps, purchases, likes, scrolls, and other interactions with the navigation menu.

At block 540, a first selectable option for presentation in a first position at the first user interface may be determined using the user interaction history. For example, ranking values for one or more available links or content may be determined using the user interaction history and/or the device identifier. The selectable options may be ranked using the ranking values. Presentation positions may be determined based at least in part on the rankings.

In some embodiments, it may be determined that the user identifier is a shared account user identifier, such that more than one user may be using the same account (e.g., a household, etc.). In such instances, the device identifier of the user device may be used to determine the first selectable option for presentation in the first position at the first user interface, along with user interaction data associated with the device identifier. In another example, a single user may be associated with multiple devices, such as a smartphone, a tablet, an audio speaker device, etc., and a device identifier may be used to determine a device that the user is currently using.

At optional determination block 550, a determination may be made as to whether a geographic location of the user device corresponds to a second selectable option. For example, computer-executable instructions stored on a memory of a device, such as a navigation menu management server, may be executed to determine a location of the user device and that the user device is within a predetermined geographic area corresponding to a second selectable option. If it is determined at block 550 that the geographic location of the user device corresponds to a second selectable option, the process flow 500 may proceed to block 560, at which the second selectable option is prioritized over the first selectable option. The prioritization may be regardless of whether the user is likely to select the second selectable option in some instances. As a result, location based content may be available to the user and may be presented in a prioritized position. The process flow 500 may then proceed to block 580.

If it is determined at block 550 that the geographic location of the user device does not correspond to a second selectable option, the process flow 500 may proceed to optional determination block 570, at which a determination may be made as to whether a time of day of the user device corresponds to a second selectable option. For example, computer-executable instructions stored on a memory of a device, such as a navigation menu management server, may be executed to determine a time of day associated with the user device or associated with the first request, and may determine whether the time of day is associated with or corresponds to a second selectable option. For example, a morning time of day may correspond to selectable options for coffee delivery. Other embodiments may consider various time-based factors, such as seasonality (e.g., summertime, wintertime, Christmas holiday, Super Bowl, etc.), a day of the week, a day of the month, and the like. If it is determined at block 570 that the time of day corresponds to a second selectable option, the process flow 500 may proceed to block 560, at which the second selectable option is prioritized over the first selectable option. The prioritization may be regardless of whether the user is likely to select the second selectable option in some instances. As a result, time based content may be available to the user and may be presented in a prioritized position. The process flow 500 may then proceed to block 580. If it is determined at block 570 that the time of day does not correspond to a second selectable option, the process flow 500 may proceed to block 580.

At block 580, the first user interface may be generated. At optional block 590, the first user interface may be sent to the user device for presentation.

Figure 6:
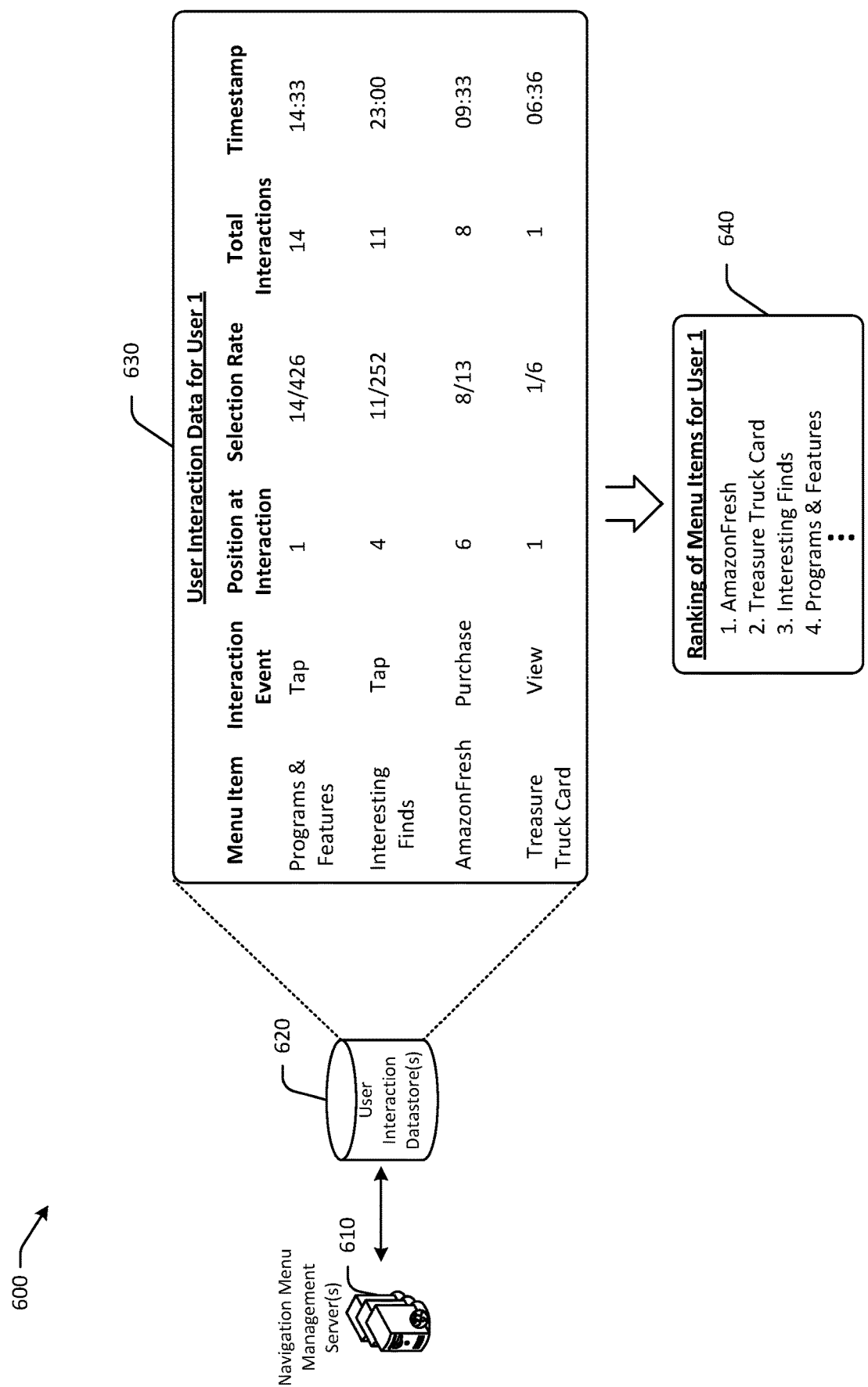
FIG. 6 is a schematic illustration of an example system with one or more navigation menu management servers in communication with one or more user interaction datastore(s) in accordance with one or more embodiments of the disclosure

FIG. 6 depicts an example system 600 with one or more navigation menu management servers 610 in communication with one or more user interaction datastore(s) 620 in accordance with one or more embodiments of the disclosure. The user interaction datastore(s) 620 may include user interaction data linked to or associated with respective user identifiers. For example, first user interaction data 630 may be for a first user identifier, such as "User 1." The first user interaction data 630 may include navigation menu item identifier data for links or content in a navigation menu that the user has interacted with. The first user interaction data 630 may include an indication of the type of interaction with the respective navigation menu item identifier. For example, the user may have interacted with a "programs & features" menu item by tapping on the link. Additional information may include the position of the link or content at the time of the interaction or an order of presentation in the navigation menu when the interaction occurred, as well as a calculated selection rate for the particular menu item. Certain embodiments may include a total number of interactions and a timestamp of the respective interaction. As user interactions are detected, the respective user interactions may be added to the first user interaction data 630, along with additional information, such as an identifier, a menu position, a timestamp, and the like for later use.

The first user interaction data 630 may include historical user interaction history for a certain time interval. Additional examples of user interaction data include a tap of an "interesting finds" link that was at a fourth position in the menu when the link was selected. A selection rate may be 11/252 for the "interesting finds" link, which may indicate that 252 impressions of the link were presented and the link was selected in 11 instances. The total number of interactions may be 11 for the "interesting finds" link, with a last interaction having a timestamp of 23:00. In some embodiments, the total interactions metric may be for a lifetime of the user interaction history and may therefore be different than that indicated in the selection rate, which may be for a certain time interval. Another example in the first user interaction data 630 may include a purchase of Amazon-Fresh that was at a sixth position, where the selection rate for AmazonFresh is 8/13. The User 1 may have viewed a Treasure Truck card when it was at a first position, and the Treasure Truck card may have a selection rate of 1/6.

The first user interaction data 630 can be used to determine positioning for links or content in subsequent navigation menus. For example, selection rates may indicate that AmazonFresh should be in a first position due to its highest selection rate relative to the other links in the example of FIG. 6. In some embodiments, the total interactions metric may be used, so as to create a "your most used" section. In other embodiments, combinations and/or weighted evaluations of some or all of the data in the first user interaction data 630 may be used to generate ranking values for subsequent navigation menu content placement.

For example, in FIG. 6, the first user interaction data 630 may be used to generate a ranking of menu items 640 for User 1. AmazonFresh may be in a first position, followed by Treasure Truck card (if available based on location, for example) in a second position, followed by "interesting finds" in a third position, and "programs & features" in a fourth position. The ranking of menu items 640 for User 1 may be based at least in part on the respective selection rates in the example of FIG. 6. In some embodiments, an aggregate user interaction history may be determined for more than one user identifier, and can be used to determine content placement for new users, or users that have a limited user interaction history. For example, if the aggregate user interaction history indicates that "electronics" is the product category that most users interact with or has the highest selection rate, the "electronics" link or content may be moved to a first position by default, and later customized as the user builds a user interaction history. In some embodiments, data stored in the user interaction datastore(s) 620 may be processed using an elastic-map-reduce function or other map-reduce function so as to process large amounts of unstructured data across a number of computer clusters.

Figure 7:
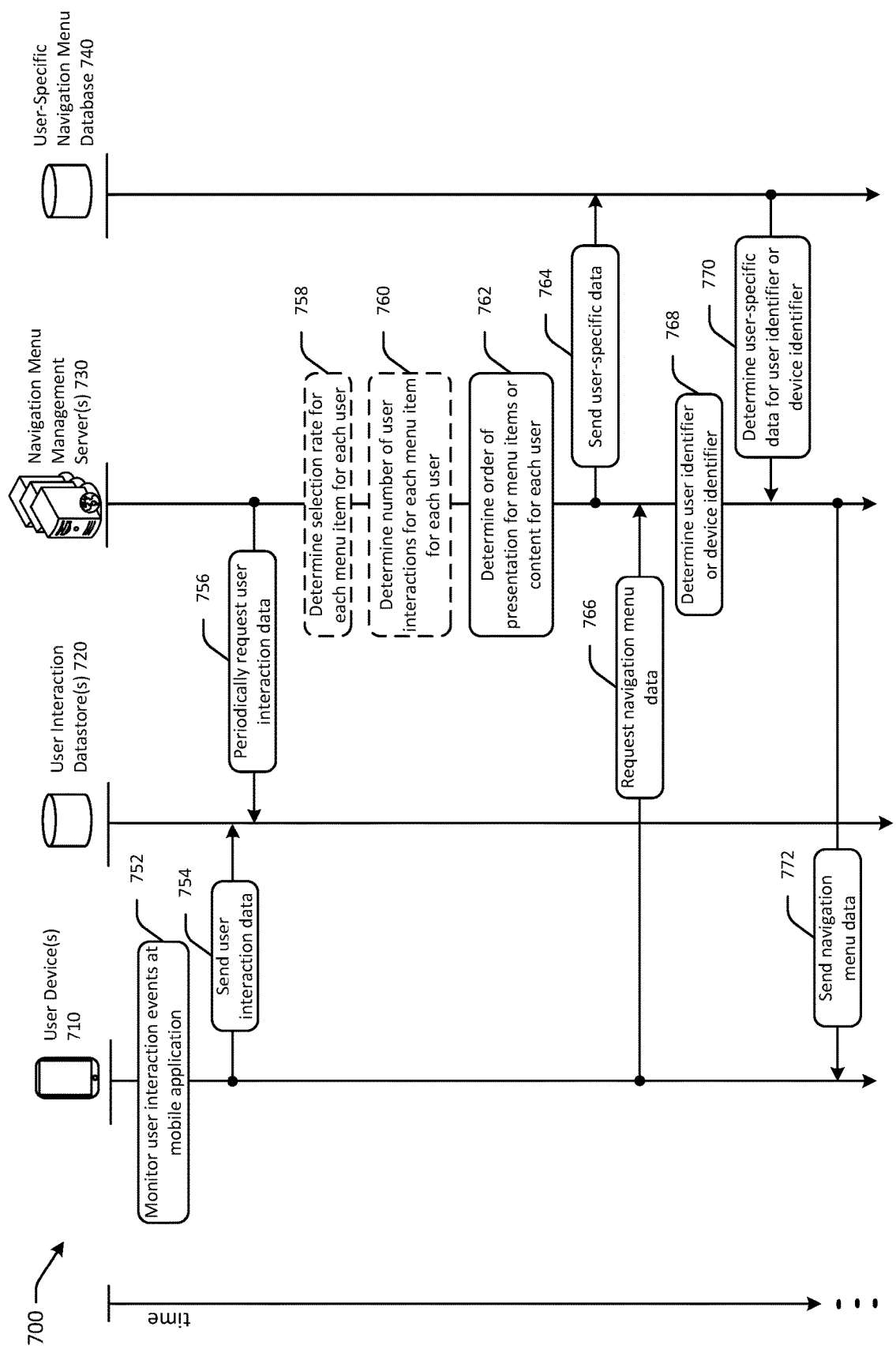
FIG. 7 is a schematic illustration of an example data flow over time in accordance with one or more example embodiments of the disclosure.

FIG. 7 is a schematic illustration of an example data flow 700 over time in accordance with one or more example embodiments of the disclosure. A navigation menu generation system may include one or more user devices 710, one or more user interaction datastores 720, one or more navigation menu management servers 730, and/or user-specific navigation menu data 740. Each of the system components may be in communication via one or more networks.

At operation 752, the user device 710 may monitor user interaction events at a mobile application. For example, the user device 710 may determine user interactions with various components or user interface elements of a navigation menu of the mobile application. The user interaction events may be stored locally at the user device 710. At operation 754, the user device 710 may send the user interaction data to the user interaction datastore(s) 720. The user interaction datastore(s) 720 may store the user interaction data along with a user identifier and/or a device identifier of the user device 710.

At operation 756, the navigation menu management server(s) 730 may periodically request user interaction data from the user interaction datastore(s) 720. The navigation menu management server(s) 730 may use the user interaction data to determine navigation menu arrangements, or placement of content in the navigation menu, specific to certain users. At optional operation 758, the navigation menu management server(s) 730 may determine a selection rate for each menu item for each user. For example, for each item, such as a link or other content, the navigation menu management server(s) 730 may determine a selection rate. This may be determined for some or all users. At optional operation 760, a number of user interactions for each menu item may be determined for each user. Such determinations may be made based at least in part on the user interaction data.

At operation 762, the navigation menu management server(s) 730 may determine an order of presentation for menu items or content for each user. The order of presentation may be based at least in part on the selection rate, the number of user interactions, time of day, location, a combination of factors, and the like.

At operation 764, the navigation menu management server(s) 730 may send user-specific data to the user-specific navigation menu data 740 for storage. The user-specific navigation menu data 740 may be a database that stores the most recent order of presentation or ranked navigation menu data that can be used to generate navigation menus for particular users.

At operation 766, the user device 710 may request navigation menu data from the navigation menu management server(s) 730. At operation 768, the navigation menu management server(s) 730 may determine a user identifier associated with the request or a device identifier of the user device 710. At operation 770, the navigation menu management server(s) 730 may determine user-specific data for the user identifier or the device identifier. For example, the navigation menu management server(s) 730 may use the user identifier or the device identifier as a key to access data stored in the user-specific navigation menu data 740. The navigation menu management server(s) 730 may therefore access cached or predetermined menu rankings, so as to reduce latency in presentation of the navigation menu at the user device 710. At operation 772, the navigation menu management server(s) 730 may send navigation menu data to the user device 710. The user device 710 may receive the navigation menu data and may render the navigation menu using the navigation menu data.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 8:
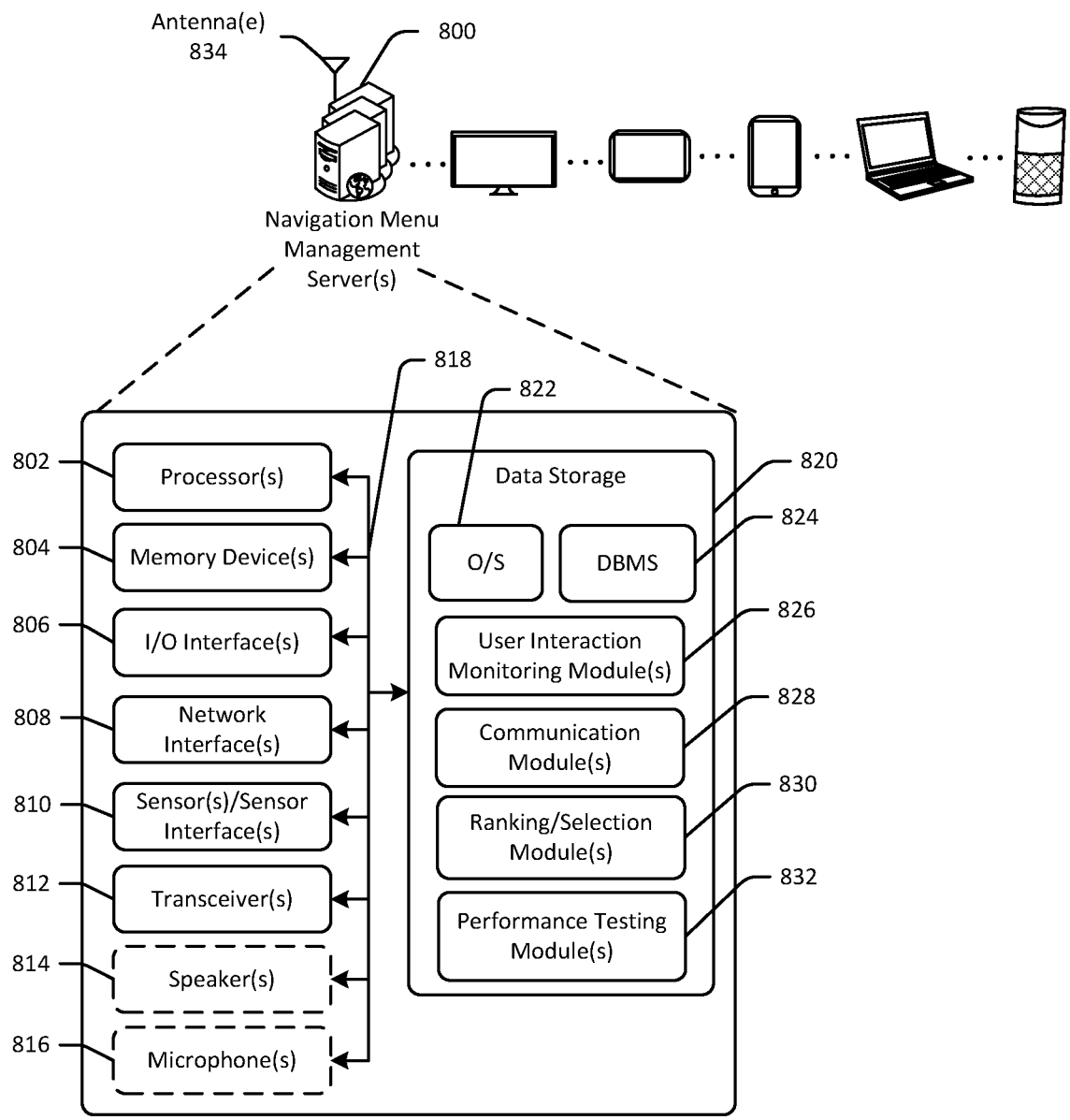
FIG. 8 is a schematic block diagram of an illustrative computer device in accordance with one or more example embodiments of the disclosure.

FIG. 8 is a schematic block diagram of an illustrative navigation menu generation server(s) 800 in accordance with one or more example embodiments of the disclosure. The navigation menu generation server(s) 800 may include any suitable computing device capable of receiving and/or generating data and generating user interfaces or components, including, but not limited to, a streaming audio device, a user device such as a smartphone, tablet, e-reader, wearable device, or the like; a desktop computer; a laptop computer; a content streaming device; a set-top box; or the like. The navigation menu generation server(s) 800 may correspond to an illustrative device configuration for the remote servers of FIGS. 1-7. In some embodiments, the navigation menu generation server(s) 800 may be one server in a fleet of servers, or may be a group of servers, or may be a single server. In some embodiments, a single remote server or single group of remote servers may be configured to perform more than one type of product recommendation and/or search query tracking functionality.

The navigation menu generation server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the navigation menu generation server(s) 800 may include one or more processors (processor(s)) 802, one or more memory devices 804 (generically referred to herein as memory 804), one or more input/output (110) interface(s) 806, one or more network interface(s) 808, one or more sensors or sensor interface(s) 810, one or more transceivers 812, one or more optional speakers 814, one or more optional microphones 816, and data storage 820. The navigation menu generation server(s) 800 may further include one or more buses 818 that functionally couple various components of the navigation menu generation server(s) 800. The navigation menu generation server(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the navigation menu generation server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the navigation menu generation server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more user interaction monitoring module(s) 826, one or more communication module(s) 828, one or more ranking/selection module(s) 830, and/or one or more performance testing module(s) 832. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the navigation menu generation server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, purchase history information, device identifier information, user profile information, and other information.

The processor(s) 802 may be configured to access the memory 804 and execute computer-executable instructions loaded therein. For example, the processor(s) 802 may be configured to execute computer-executable instructions of the various program module(s), applications, engines, or the like of the navigation menu generation server(s) 800 to cause or facilitate various operations to be performed in accordance with one or more embodiments of the disclosure.

The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the user interaction monitoring module(s) 826 may include computer-executable instructions, code, or the like that responsive to execution by one or more of the processor(s) 802 may perform functions including, but not limited to, monitoring user interaction data at user devices, determining real-time or near real-time user interaction metrics for a number of different pieces of content or cards from a plurality of user devices, receiving user interaction data from a plurality of devices, determining impression counts, determining content or card arrangement, determining click through rates, determining selection rates, determining absolute clicks, and the like.

The communication module(s) 828 may include computer-executable instructions, code, or the like that responsive to execution by one or more of the processor(s) 802 may perform functions including, but not limited to, communicating with one or more devices, for example, via wired or wireless communication, communicating with remote servers, communicating with remote datastores, sending or receiving notifications, communicating with cache memory data, and the like.

The ranking/selection module(s) 830 may include computer-executable instructions, code, or the like that responsive to execution by one or more of the processor(s) 802 may perform functions including, but not limited to, determining ranking values for links or options in menu lists, determining content rankings, determining user-specific rankings, determining card or content performance data, determining card or content positioning and/or arrangement, determining card or content rankings, determining user preferences, determining user interaction histories, determining image placement and layering, determining a number of images to present for a particular side of a card, determining whether any portion of an image will extend beyond a card boundary, determining initial card boundaries, determining card functionality, generating cards, and the like.

The performance testing module(s) 832 may include computer-executable instructions, code, or the like that responsive to execution by one or more of the processor(s) 802 may perform functions including, but not limited to, determining a number of user interactions and/or certain events that users engage with on cards or content, determining card or content performance, determining sub-card metrics, such as color and user interaction data, placement and user interaction data, determining and/or querying user devices for interaction metrics, and the like.

Referring now to other illustrative components depicted as being stored in the data storage 820, the O/S 822 may be loaded from the data storage 820 into the memory 804 and may provide an interface between other application software executing on the navigation menu generation server(s) 800 and hardware resources of the navigation menu generation server(s) 800. More specifically, the O/S 822 may include a set of computer-executable instructions for managing hardware resources of the navigation menu generation server(s) 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the navigation menu generation server(s) 800 is a mobile device, the DBMS 824 may be any suitable light-weight DBMS optimized for performance on a mobile device.

Referring now to other illustrative components of the navigation menu generation server(s) 800, the input/output (I/O) interface(s) 806 may facilitate the receipt of input information by the navigation menu generation server(s) 800 from one or more I/O devices as well as the output of information from the navigation menu generation server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the navigation menu generation server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The navigation menu generation server(s) 800 may further include one or more network interface(s) 808 via which the navigation menu generation server(s) 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna(e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the navigation menu generation server(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the navigation menu generation server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the navigation menu generation server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the navigation menu generation server(s) 800 may include alternate and/or additional hardware, software, or firmware components beyond those described or depicted without departing from the scope of the disclosure. More particularly, it should be appreciated that software, firmware, or hardware components depicted as forming part of the navigation menu generation server(s) 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to at least one memory, a first request for a first user interface from a user device, wherein the first user interface is for a digital application navigation menu;
   determining a user identifier associated with the first request;
   determining user interaction history data using the user identifier;
   determining a device type of the user device;
   determining a device form factor associated with the device type;
   determining a first selectable option and a second selectable option for presentation at the first user interface based at least in part on the device form factor;
   determining a first probability value indicative of a likelihood that the first selectable option will be selected using the user interaction history data;
   determining a second probability value indicative of a likelihood that the second selectable option will be selected using the user interaction history data;
   determining that the first probability value is greater than the second probability value;
   determining, at a first instance, that the first selectable option is to be presented at a first position at the first user interface;
   determining, at the first instance, that the second selectable option is to be presented at a second position at the first user interface;
   generating the first user interface;
   sending the first user interface to the user device;
   determining a first user interaction event with the second selectable option;
   determining, at a second instance and based at least in part on the first user interaction event and at least one of a time of day, a predicted user interaction, or a geographic location of the user device, that the second selectable option is to be presented higher than the first selectable option; and
   discarding a second request for a second user interface that is associated with the user identifier for a predetermined time interval.

2. The method of claim 1, wherein the digital application navigation menu comprises an ordered list of selectable options, and wherein the first selectable option is a selectable link for a product category.

3. The method of claim 1, further comprising:
   determining that a first selection rate for the first selectable option is greater than a second selection rate for the second selectable option using the user interaction history.

4. The method of claim 1, further comprising:
   determining that a first number of user interactions with the first selectable option is greater than a second number of user interactions with the second selectable option using the user interaction history.

5. The method of claim 1, further comprising:
   determining that a first selection rate for the first selectable option is less than a second selection rate for the second selectable option using the user interaction history; and
   determining a timestamp of the first request;
   wherein determining the first selectable option for presentation in the first position at the first user interface using the user interaction history comprises determining the first selectable option for presentation in the first position at the first user interface using the user interaction history and the timestamp.

6. The method of claim 1, further comprising:
   determining that a first selection rate for the first selectable option is less than a second selection rate for the second selectable option using the user interaction history; and
   determining that the user device is within a predetermined geographic area corresponding to the second selectable option.

7. The method of claim 1, further comprising:
determining aggregate user interaction history for a plurality of user identifiers; and
determining that a first selection rate for the first selectable option is greater than a second selection rate for the second selectable option using the aggregate user interaction history.

8. The method of claim 1, further comprising:
determining that the user identifier is a shared account user identifier; and
determining a device identifier of the user device;
wherein determining the first selectable option for presentation in the first position at the first user interface using the user interaction history comprises determining the first selectable option for presentation in the first position at the first user interface using the user interaction history and the device identifier.

9. A device comprising:
at least one memory that stores computer-executable instructions; and
at least one processor configured to access the at least one memory and execute the computer-executable instructions to:
determine a first request for a first user interface from a user device, wherein the first user interface is a digital application navigation menu;
determine a user identifier associated with the first request;
determine user interaction history data using the user identifier;
determine a device type of the user device;
determine a device form factor associated with the device type;
determine a first selectable option and a second selectable option for presentation at the first user interface based at least in part on the device form factor;
determine a first probability value indicative of a likelihood that a first selectable option will be selected using the user interaction history data;
determine a second probability value indicative of a likelihood that a second selectable option will be selected using the user interaction history data;
determine that the first probability value is greater than the second probability value;
determine, at a first instance, that the first selectable option is to be presented at a first position at the first user interface;
determine, at the first instance, that the second selectable option is to be presented at a second position at the first user interface;
determine a first user interaction event with the second selectable option;
determine, at a second instance and based at least in part on the first user interaction event and at least one of a time of day, a predicted user interaction, or a geographic location of the user device, that the second selectable option is to be presented higher than the first selectable option;
dynamically generate the first user interface with the second selectable option at a higher position than the first selectable option; and
discarding a second request for a second user interface that is associated with the user identifier for a predetermined time interval.

10. The device of claim 9, wherein the digital application navigation menu comprises an ordered list of selectable options, and wherein the first selectable option is a selectable link for a product category.

11. The device of claim 9, wherein the at least one processor is further configured to access the at least one memory and execute the computer-executable instructions to:
determine that a first selection rate for the first selectable option is less than a second selection rate for the second selectable option using the user interaction history; and
determine that the user device is within a predetermined geographic area corresponding to the second selectable option.

12. A method comprising:
determining, by one or more computer processors coupled to at least one memory, a first request for a first user interface from a user device, wherein the first user interface is for a digital application navigation menu;
determining user interaction history data;
determining a device type of the user device;
determining a device form factor associated with the device type;
determining a first selectable option and a second selectable option for presentation at the first user interface based at least in part on the device form factor;
determining, based at least in part on the user interaction history data, a first probability value indicative of a likelihood that the first selectable option will be selected;
determining, based at least in part on the user interaction history data, a second probability value indicative of a likelihood that the second selectable option will be selected;
determining that the first probability value is greater than the second probability value;
determining that an existing order of presentation of the first selectable option and the second selectable option is to be modified based at least in part on at least one of a time of day, a predicted user interaction, the user interaction history data, or a geographic location of the user device;
generating the first user interface with the modified order of presentation;
sending the first user interface to the user device; and
discarding a second request for a second user interface that is associated with the user identifier for a predetermined time interval.

13. The method of claim 12, wherein the digital application navigation menu comprises an ordered list of selectable options, and wherein the first selectable option is a selectable link for a product category.

14. The method of claim 12, further comprising:
determining a device identifier of the user device; and
determining a user account associated with the device identifier, wherein the user interaction history data is associated with the user account.

15. The method of claim 12, further comprising:
determining that a first selection rate for the first selectable option is greater than a second selection rate for the second selectable option using the user interaction history.

* * * * *